(12) United States Patent
Lardy et al.

(10) Patent No.: US 7,353,723 B2
(45) Date of Patent: Apr. 8, 2008

(54) USE OF AN ELECTRIFIED PIN TO DETECT LOAD TRANSFER TO A SECONDARY NUT IN A SCREW ACTUATOR

(75) Inventors: Pascal Lardy, Montivilliers (FR); Patrice Nevoret, Asnieres (FR); Olivier Pansanel, Herblay (FR); Christian Dorval, Colombes (FR)

(73) Assignee: Goodrich Actuation System SAS, Buc (FR)

( * ) Notice: Subject to any disclaimer, the term of this patent is extended or adjusted under 35 U.S.C. 154(b) by 356 days.

(21) Appl. No.: 10/661,668

(22) Filed: Sep. 11, 2003

(65) Prior Publication Data
US 2005/0016305 A1    Jan. 27, 2005

(30) Foreign Application Priority Data
Sep. 11, 2002    (FR) .................................. 02 11228

(51) Int. Cl.
*F16H 3/06*    (2006.01)
*F16H 27/02*   (2006.01)
*F16H 29/02*   (2006.01)
*F16H 29/20*   (2006.01)

(52) U.S. Cl. ..................................... 74/89.23; 340/438
(58) Field of Classification Search ............... 74/89, 74/89.23, 89.28; 340/431, 438
See application file for complete search history.

(56) References Cited

U.S. PATENT DOCUMENTS

| 4,644,811 | A | | 2/1987 | Tervo |
| 5,017,912 | A | * | 5/1991 | Willis .......................... 340/676 |
| 6,234,034 | B1 | | 5/2001 | Ando |
| 6,498,470 | B2 | * | 12/2002 | Kelly et al. ................ 324/71.5 |
| 6,928,895 | B2 | * | 8/2005 | Davies et al. .............. 74/89.26 |

\* cited by examiner

*Primary Examiner*—Richard Ridley
*Assistant Examiner*—James Pilkington
(74) *Attorney, Agent, or Firm*—Blakely Sokoloff Taylor & Zafman (57) ABSTRACT

The invention relates to an actuator for actuating a moving member, said actuator essentially comprising a screw and at least two nuts engaged on the screw, relative movement between the screw and the nuts generating said actuation, said actuator further comprising a pin through which an electrical link passes, a force-transmitting element placed in the path of the force between the screw and the moving member via one of the nuts, and a mechanical extension of said force-transmitting element that extends to the vicinity of the other nut, the pin passing both through the mechanical extension and through an element coupled to the other nut so that any abnormal shift in the force-transmitting element relative to the screw results in shear between its mechanical extension and the element coupled to the other nut, causing the pin to break and causing the electrical link to be broken.

10 Claims, 7 Drawing Sheets

USE OF AN ELECTRIFIED PIN TO DETECT LOAD TRANSFER TO A SECONDARY NUT IN A SCREW ACTUATOR

FIELD OF THE INVENTION

The invention relates to "fail-safe" screw actuators, i.e. to actuators having a screw and two nuts. More particularly, the invention relates to systems for detecting load transfer from one nut to the other in such actuators.

For example, the invention is applicable to actuators of the "ball" type, when such actuators are used for trimming a trimmable horizontal stabilizer (THS) of an aircraft. The invention is also applicable to any screw system, e.g. having rollers or wheels.

BACKGROUND OF THE INVENTION

Actuators are known that have additional safety levels constituted by the presence of a second nut which, being separated from the screw by a small amount of clearance, takes up the load on the primary nut in the event said primary nut fails.

While admittedly offering safety, such devices suffer from the risk that a mode of operation relying on the second nut only, after the first nut has failed, might not be detected. A device in such a situation no longer has its additional safety level, and therefore loses its initial advantage.

It is desirable for that mode of operation to be indicated as quickly as possible in order to avoid a dormant failure mode.

By way of illustration, it has also been proposed, in U.S. Pat. No. 5,833,033, in the field of detecting wear in brake pads in motor vehicles, to provide a wear detector probe in the form of an electrical cable loop organized to be cut by abrasion. The electrical link being broken indicates that it is necessary to replace the brake pad. That type of device, proposed in another field, does not satisfy the constraint of exactly detecting the precise instant at which the stresses are transmitted to the secondary nut.

OBJECTS AND SUMMARY OF THE INVENTION

An object of the invention is to provide means for detecting going over to the secondary nut, which means are reliable while also being compact and inexpensive.

The invention achieves this object by means of an actuator for actuating a moving member, said actuator essentially comprising a screw and at least two nuts engaged on the screw, relative movement between the screw and the nuts generating said actuation, said actuator further comprising a pin through which an electrical link passes, a force-transmitting element placed in the path of the force between the screw and the moving member via one of the nuts, and a mechanical extension of said force-transmitting element that extends to the vicinity of the other nut, the pin passing both through the mechanical extension and through an element coupled to the other nut so that any abnormal shift in the force-transmitting element relative to the screw results in shear between its mechanical extension and the element coupled to the other nut, causing the pin to break and causing the electrical link to be broken.

BRIEF DESCRIPTION OF THE DRAWINGS

Other objects, characteristics, and advantages of the invention appear on reading the following detailed description of the invention given with reference to the accompanying figures, in which.

MORE DETAILED DESCRIPTION

Figure 1:
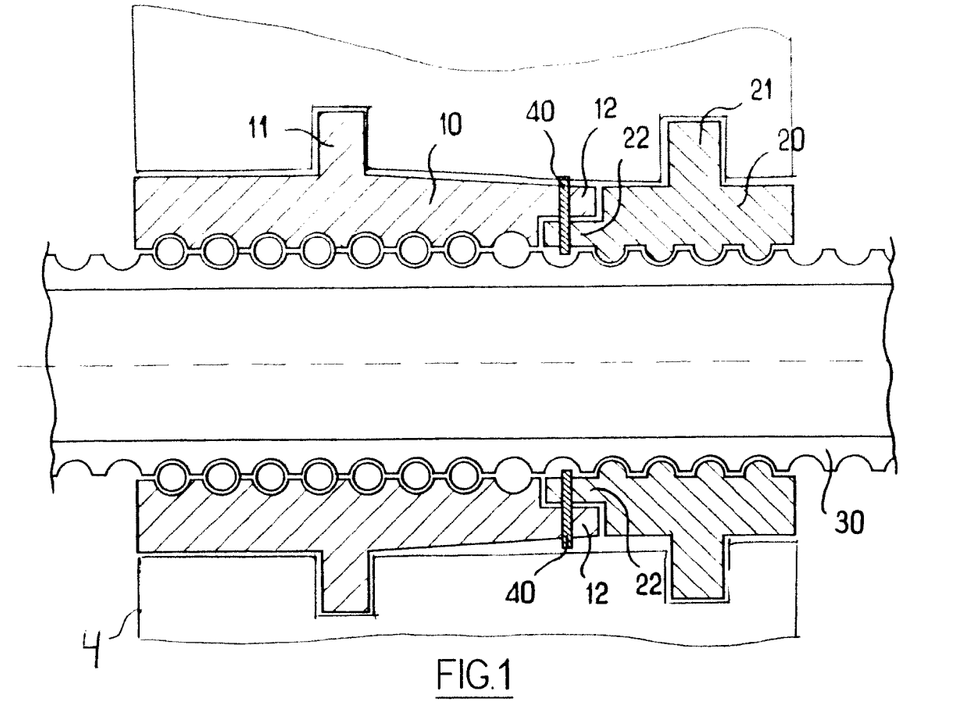
FIG. 1 is a fragmentary longitudinal section view of a screw actuator of the invention.
Figure 2:
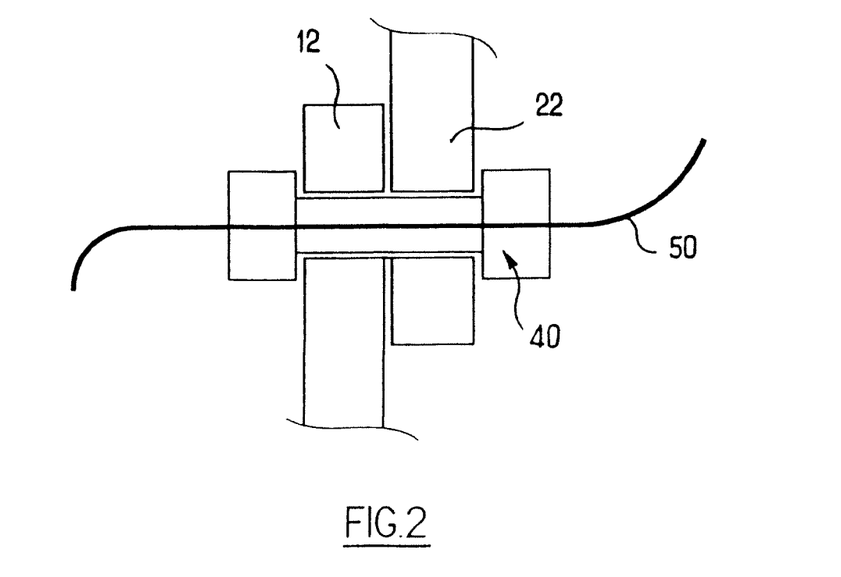
FIG. 2 is an enlarged fragmentary section view of a pair of nuts equipped with a detector pin of the invention.

The pair of nuts 10 and 20 in FIG. 1 consist of a primary nut 10 and of a secondary nut 20 of a screw actuator whose structure is of the "fail safe" type.

Under normal operating conditions, the primary nut 10, which in this example is a ball nut, is loaded and transmits the load from the screw 30 to the nut 10. In this example, the nut 10 is constrained to move in translation with a trimmable horizontal stabilizer (THS) 4 of an airplane, and the screw 30 is coupled to the structure of the airplane. References 11 and 21 designate respective fastening stub axles of the nuts 10 and 20, which stub axles are organized to be connected, independently from each other, to the THS 4 of the airplane.

Each of the screws has a respective circumferential shoulder 12, 22, which shoulders overlap each other and extend around the periphery of the screw. Thus, said shoulders 12 and 22 have respective facing faces extending substantially in the same direction as the screw, said shoulders nevertheless being circular.

The secondary nut 20 is also mounted on the screw, in parallel with the primary nut 10. The two nuts are held secured together by means of a pin 40 which passes through the shoulders 12 and 22 and in particular through their facing faces.

Relative to the thread of the screw, the secondary nut 20 has clearance sufficient for it not to be loaded under normal operation conditions under which the primary nut 10 takes up the load.

In this example, the secondary nut 20 is thus merely a basic nut whose thread is a single-start male friction male thread that is complementary to the thread 30. In this particular example, the secondary nut 20 is thus not a ball nut, unlike the primary nut 10. Naturally, a secondary ball nut could also be considered.

Figure 3:
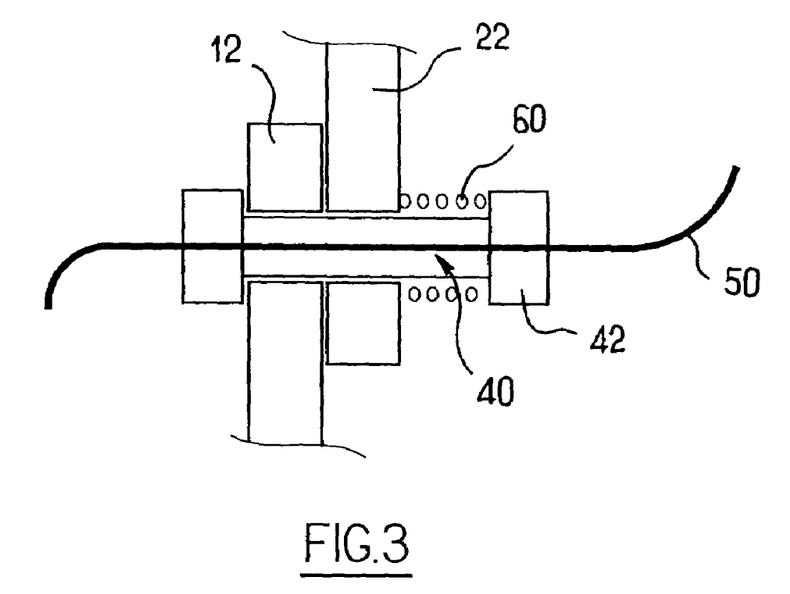
FIG. 3 is an enlarged fragmentary section view of a pair of nuts equipped with a pin in a variant of the invention.

As shown in FIG. 3, a conductor wire 50 is contained in the pin 40 which, for this purpose, is provided with a through hole, and an insulator surrounds the wire inside said hole.

In this example, the wire 50 is also connected directly to a power supply system controlling the positioning of the actuator.

After failure of the nut 10, the nut 20 is mechanically placed in the path of the load conveyed from the structure of the airplane to the moving member.

Appearance of load in the secondary path of the assembly simultaneously causes the pin 40 and the conductor wire 50 to shear.

In this example, the wire 50 is soldered at the two ends of the shear pin 40 to a very rigid portion guaranteeing electrical continuity for the wire 50 inside the pin. The very rigid portion makes it possible to guarantee that the electrical connection is broken cleanly in the event that the real displacement of the pin 40 is small.

By breaking, the conductor wire 50 prevents the monitored electrical current from flowing, and thereby indicates the failure.

By breaking, the wire 50 also causes the actuator to be immobilized until the fault is repaired.

Fasteners between the two nuts 10 and 20 may be provided for providing relatively loose coupling between the two nuts. Such fasteners may, for example, be coupled to the stub axles 11 and 21. The fasteners may also be pins dimensioned to withstand loads larger than the load withstood by the detector pin 40.

However, said fasteners or other pins have clearance sufficient to make it possible for the load initially borne by the primary nut 10 and transferred to the secondary nut 20 to give rise to the movement that breaks the detector pin 40 by taking up said clearance.

Typically, provision is made for each of the primary and secondary nuts to be coupled to the controlled element, which is the THS in this example, via a coupling that is specific to the nut.

Thus, the load goes over to the secondary nut by loading the coupling specific to the secondary nut, and by then unloading the coupling specific to the primary nut.

In a variant, the loose fasteners provided between the two nuts are stressed only when one of the two specific couplings of the nuts cannot transmit the load, e.g. due to accidental damage.

Thus, if the coupling between the secondary nut and the THS cannot transmit the stresses, then the secondary nut, once loaded, transmits the stresses to the THS via the fasteners between the nuts, via the primary nut, and then via the specific coupling between the primary nut and the THS.

In various variants, the shear pin may be placed between various pairs of members that shift mutually if a coupling between the THS and the actuator screw weakens.

Figure 4:
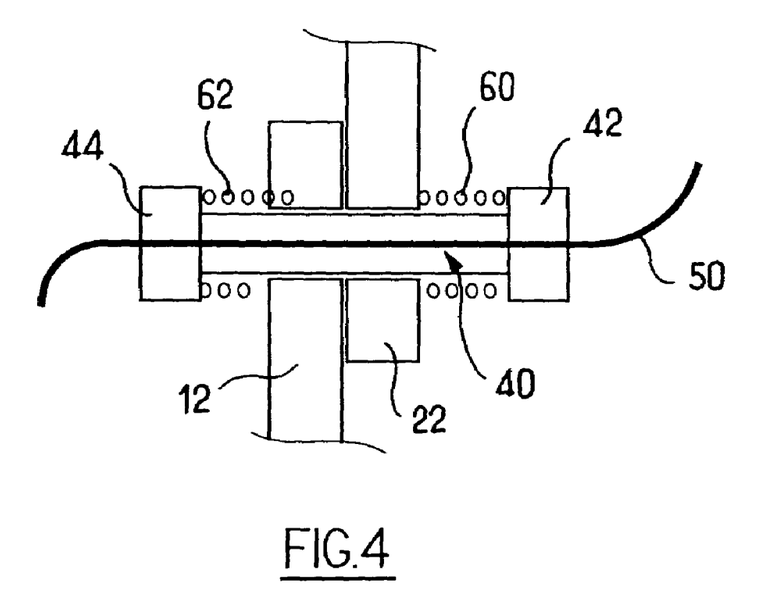
FIG. 4 is an enlarged fragmentary section view of a pair of nuts equipped with a pin in a variant of the invention.

In order to confirm the failure by visual detection through examining the pin (by ejecting the portions separated by shearing), and in order to ensure that the two portions of the wire have been disengaged completely so as to prevent them from being reconnected by contact being re-established between them, a spring 60 may be interposed between one end of the pin 40 and a wall of one of the nuts, as shown in FIGS. 3 and 4.

Thus, as shown in FIG. 3, the pin 40 advantageously has a wider head 42 at one of its ends, a helical spring 60 bearing at one end against said wider head 42 and at its other end against the overlapping portion 22 that is part of the nut 20.

In the example shown in FIG. 4, the pin 40 has two wider heads 42, 44 and is provided with two helical springs 60, 62, each of which is placed between a wider head and an overlapping portion of a respective nut.

Figure 5:
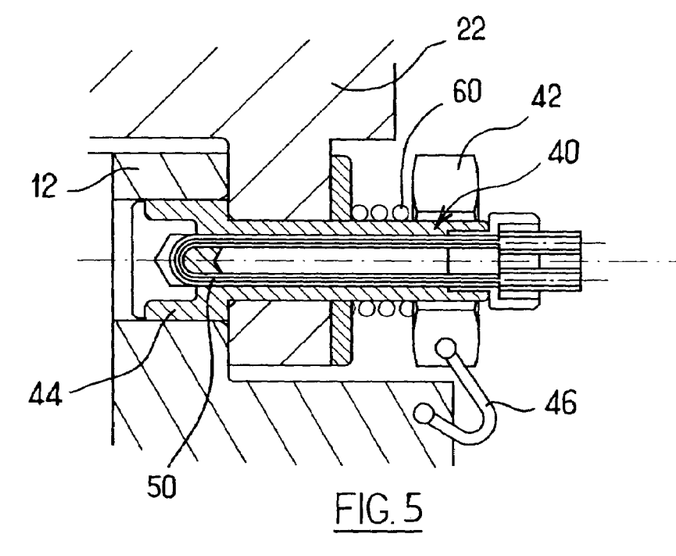
FIG. 5 is an enlarged fragmentary section view of a pair of nuts in a variant of the invention.

In the variant shown in FIG. 5, the outer head 42 is constituted by a hexagonal nut screwed onto the pin, forming a removable head, and thus allowing such a pin to be put in place in a respective one of the bores in the primary and secondary nuts because the opposite end of the pin is provided with an integrally formed wider head.

FIG. 5 also shows that the electrical link 50 extends over a go-and-return path in the pin, from the outside of the device.

Thus, the electrical link 50 extends from outside the device, turns through 180° (hairpin bend) inside the primary nut 10, then goes back outwards by passing back through the overlapping coupling between the primary nut 10 and the secondary nut 20. Such a U-shape makes it possible to connect the ends of the link on one side of the device only, thereby avoiding the necessity for a link, which is intrinsically fragile, to pass through the device to the other side.

In addition, the electrical wire forming the link 50 is terminated at its outer ends by protuberances, securing the ends of the U-shape to the structure of the pin.

In addition, in this variant which is also provided with a spring 60 for extending the pin after it breaks, the spring acts itself after shearing to generate a longitudinal tension necessary to break the wire 50.

More precisely in this example, the clearance between the primary nut 10 and the secondary nut 20 is sufficient to cause the pin 40 to break by shearing, but is insufficient to break the electrical wire 50 by shearing, said electrical wire 50 having a certain amount of shear resilience.

Thus, after the pin breaks, the link 50 breaks only under the effect of a longitudinal extension force exerted by the spring 60.

It should be noted that the electrical wire 50 in this example is covered with a flexible insulating sheath which, in addition to imparting further shear flexibility to the wire 50, provides an insulation barrier between the wire and all of the metal portions of the system, thereby preventing any interference current from being generated before or after the breaking.

It should also be noted that the hexagonal head 42 is provided with a flexible link 46 which connects it to the primary nut, making it possible, after the two portions of the nut have been separated due to shearing, to retain the portion pushed away by the spring and to prevent it from becoming lost in the environment of the system.

In other variants, the shear pin may be placed between other pairs of members that shift mutually in the event that a coupling between the THS (controlled moving member) and the actuating screw is weakened.

The weakening in question may consist merely in normal wear on the coupling between the primary nut and the screw, or else in damage to the coupling between the primary nut and the controlled member. Thus, deformation or breaking may occur in a specific coupling between a primary nut and the THS causing the positioning to be shifted, which is used to generate shearing of the pin.

In the following particular example, the pin is placed between two parts coupled respectively to the secondary nut and to a member secured to the coupling between the THS and the primary nut.

More specifically, in this example, the pin 40 is sheared by a fastener 90 connecting the THS to the secondary nut, thereby reproducing, at the secondary nut, any abnormal shift in the THS due to a failure of its coupling via the primary nut.

Thus, in the event that the primary nut shifts relative to the screw, the THS finds itself abnormally shifted, via its specific coupling to the primary nut, and said THS, via its specific coupling to the fastener of the secondary nut, transfers this abnormal shift to said fastener itself. The fastener, which is allowed to move slightly on the secondary nut, then shears the pin and activates failure detection.

With the same system, another type of failure, consisting in the specific coupling between the THS and the primary nut being broken or deformed, generates a shift which is reproduced at the secondary fastener and shears the pin.

A third type of failure, in the form of all or some of a series of fasteners between the primary nut and the coupling to the THS breaking, namely the primary nut possibly moving initially slantwise relative to the axis of the screw, is also reproduced in the form of the secondary fastener shifting via the specific couplings between the THS and the nut, and activates detection by shearing.

In this example, as when overlapping portions are used between nuts, a failure in the coupling between the controlled member and the drive screw is used to cause the pin to shear.

Figure 6:
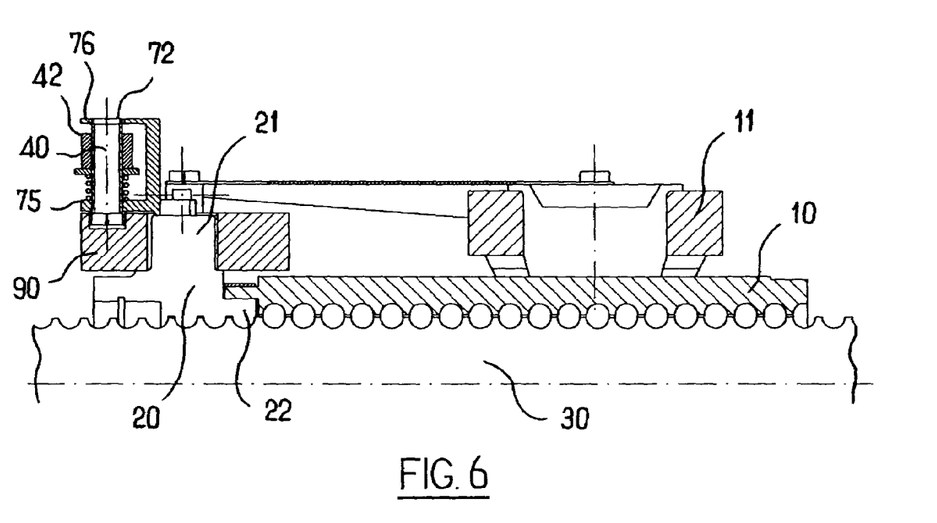
FIGS. 6 to 8 show a variant of the invention in which shearing takes place by load transfer.
Figure 7:
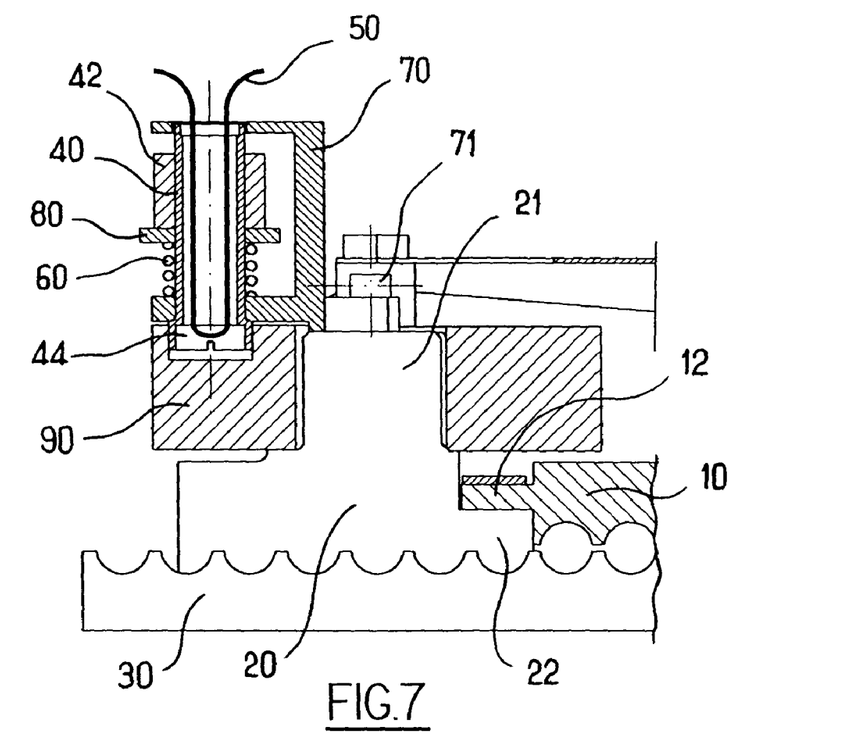
Figure 8:
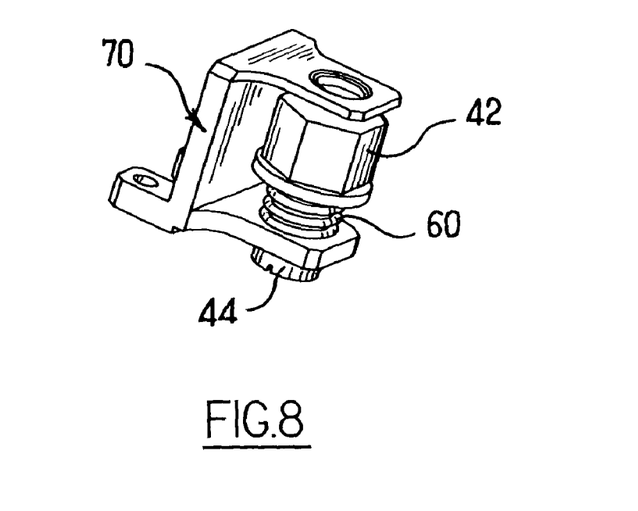

In this embodiment, the coupling between the THS and the secondary nut 20 is terminated by a transfer plate 90 surrounding a stub axle 21 of the secondary nut with a small amount of clearance. In its outer face, the transfer plate 90 has a setback into which the pin 40 penetrates, the peripheral edge of the setback being covered by a member 70 coupled to the stub axle 21, and thus organized to move slightly above the transfer plate to match the clearance of the stub axle 21 in the plate 90.

In this example, it can be noted that the member 70 thus forms a plate 75 which is secured to the stub axle and which forms an oblong hole in a direction transverse to the screw, allowing the stub axle 20 and the transfer plate 90 to turn slightly relative to each other, it being possible for such turning to occur between the primary nut and the secondary nut under normal operating conditions.

In this example, the support 70 is fixed to the secondary nut by a single holding screw.

More precisely, the support 70 also extends above the pin to form a plate thereabove for the purpose of stopping a portion of the pin that is pushed away by a spring in the event that said pin breaks.

Thus, the support 70 forms two parallel plates, one of which (75) surrounds the pin as it exits from the load take-up plate 90, and the other of which (76) covers the pin 40 at its opposite end.

More specifically, the top plate 76 of the support 70 is provided with a through passageway 72 receiving the end of the pin.

Below the stop plate 72, the pin has a circumferential protuberance, constituted in this example by a nut 42 screwed onto the pin, suitable for coming into abutment against the circumference of the top orifice in the support 70, when pushed away towards it by a helical spring 60 lying between said nut and the bottom portion of the support 70.

The pin 40 is sheared at its head 44, and then, under the action of the spring 60, bearing against the support 70 at one end and against the blocked nut 42 at the other end, the pin separates into two portions while pulling on the electrical wires and shearing them by elongation (without shearing the protective sheath covering the electrical wires so as to prevent risks of short-circuiting).

Such a layout offers a particular advantage in terms of ease of access. Thus, during a maintenance operation, it is easy to access the pin 40 in order to verify its state. This location also makes it possible to improve centering and positioning of the pin 40, and makes it possible to adopt different configurations easily in terms of compactness constraints.

The pin 40, which is easy to test during maintenance operations, is easy to replace if necessary. For symmetry reasons and for detecting the failure regardless of the position of the primary nut 10, an identical pin system is preferably installed on the other side of the fasteners. The electrical wires of the two pins may be connected together either in parallel or in series.

In the present embodiment, since the actuator for positioning the horizontal stabilizer (THS) is controlled by three monitoring and control systems, each of the systems is connected to an electrical wire that runs through the pin.

The pin 40 thus contains three electrical wires (for example), each of the wires extending over a go-and-return path. It should be noted that, in addition to separating the two pin elements after shearing, the spring holds the pin in place in the support 70 under normal operating conditions.

In the variant shown in FIGS. 9 to 12, it is desired for the secondary nut to be prevented from continuing to perform the movement-transmission function when said secondary nut is loaded in failure mode. Thus, it is desired for the secondary nut to be blocked, thereby ensuring that operating under dormant failure conditions cannot continue over time.

Typically, in this type of device, secondary nuts are adopted that are suitable for seizing when they co-operate with the screw. However, there is a certain risk that seizure will not occur. Thus, in-flight forces can be insufficient for the secondary nut to seize when it comes into contact with the screw.

Figure 9:
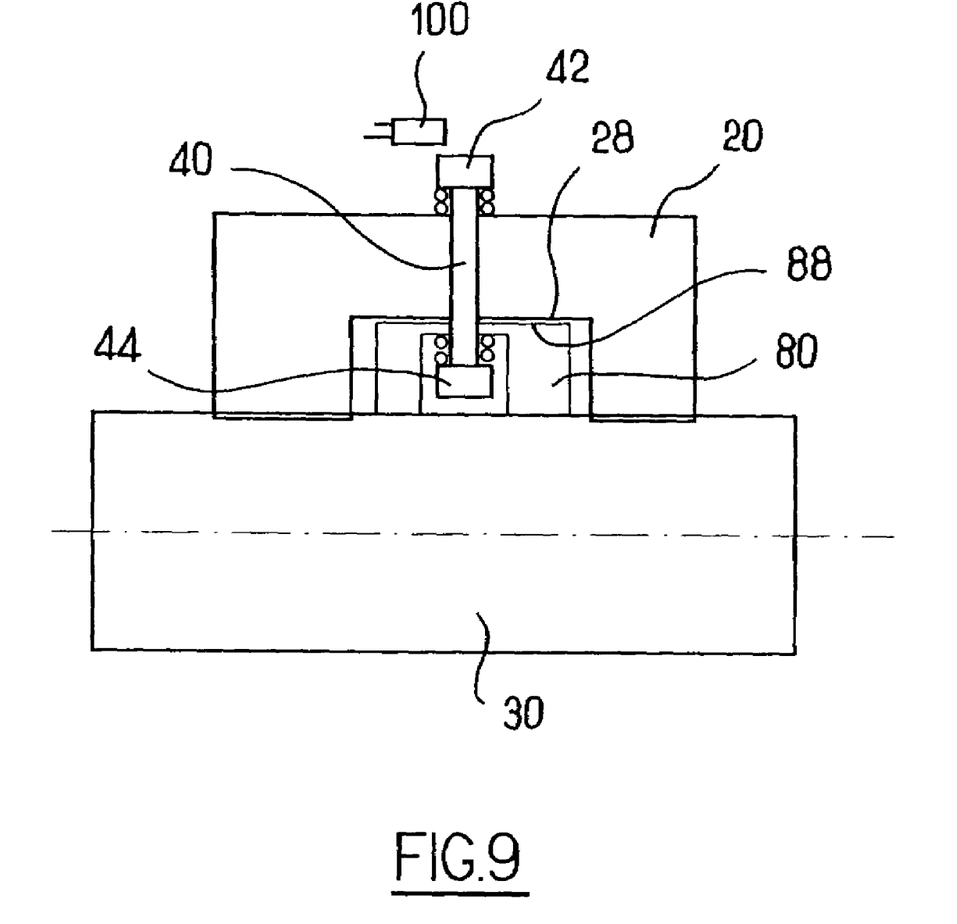
FIGS. 9 to 12 show a variant of the invention having blocking means for blocking a secondary nut.

Thus, in this device, the secondary nut 20 is equipped with means that are advantageous per Se and that serve to block said secondary nut after it has been loaded.

In FIG. 9, these means are constituted by the above-described pin which, in this example, instead of passing through the secondary nut 20 and the primary nut 10, passes through the secondary nut 20 and through an additional nut referred to below as a "lock nut" and referenced 80.

FIG. 9 shows that the lock nut 80 is considerably smaller in size than the secondary nut 20, and it is placed in an annular internal groove in the secondary nut 20.

Thus, in the longitudinal section view of FIG. 9, the lock nut 80 is situated under the secondary nut, between two end walls 24 and 26 of said secondary nut 20.

The lock nut 80 itself has an internal groove, in which it receives an end head 44 of the pin 40, while the outer head 42 of the pin 40 emerges from the outside face of the secondary nut 20.

When the primary nut has abnormal clearance relative to the screw, due to the coupling between the primary nut and the screw being damaged, the load is transmitted from the primary nut to the secondary nut 20, thereby reducing the clearance between the secondary nut 20 and the screw 30. This clearance is referenced H2 in FIG. 7.

It should be noted that the clearance H0 initially provided between the primary nut 10 and the screw 30 is smaller than the clearance H2, so that only particular damage to the coupling between the screw 30 and the primary nut 10 can cause the clearance H2 to be taken up.

In addition, the lock nut 80 itself has clearance H1 relative to the screw.

The clearance H1 is chosen to be greater than the clearance H0 of the primary nut 10, but less than the clearance H2 of the secondary nut 20. Thus, since the clearance between the lock nut 80 and the screw 30 is less than the clearance between the secondary nut 20 and the screw, the secondary nut can be loaded only after the lock nut 80 has been loaded.

Such final loading of the secondary nut 20 on the screw 30 then unavoidably causes the pin 40 to shear and break. By breaking, the pin 40 causes the detector wire (not shown in this figure) that runs through it to undergo electrical interruption.

In the present method, the pin 40 breaking is used to allow the secondary nut and the lock nut then to turn relative to each other, the secondary nut and the lock nut coming into abutment against each other in a direction axial to the screw, then causing the actuator to be blocked completely.

It should be noted that, in order to improve still further the establishment of abutting contact between the secondary nut and the lock nut, the pin 40 is provided with a spring in the internal portion of the lock nut 80, which internal spring causes the head 44 of the pin 40 to be brought into abutment against the thread on the screw 30. The head 44 then brakes the turning of the lock nut 80, while the turning of the secondary nut 20 is not braked. The lock nut 80 even tends to turn with the screw under the effect of such braking. Thus, the nut 20 and the lock nut 80 come rapidly into abutment and immobilize the system by a dual nut clamping effect.

It should be noted that, because the lock nut 80 is included in the secondary nut 20, i.e. flanked by two different faces of the nut 20, the lock nut and the secondary nut come into abutment regardless of the direction of rotation of the screw.

In preferred manner, care is taken to ensure that a coefficient of friction between the lock nut 80 and the nut 20 is particularly low at those of their faces which come into contact with each other, so that the lock nut 80 cannot start turning with the secondary nut 20 without generating the stresses necessary to block the system.

Figure 10:
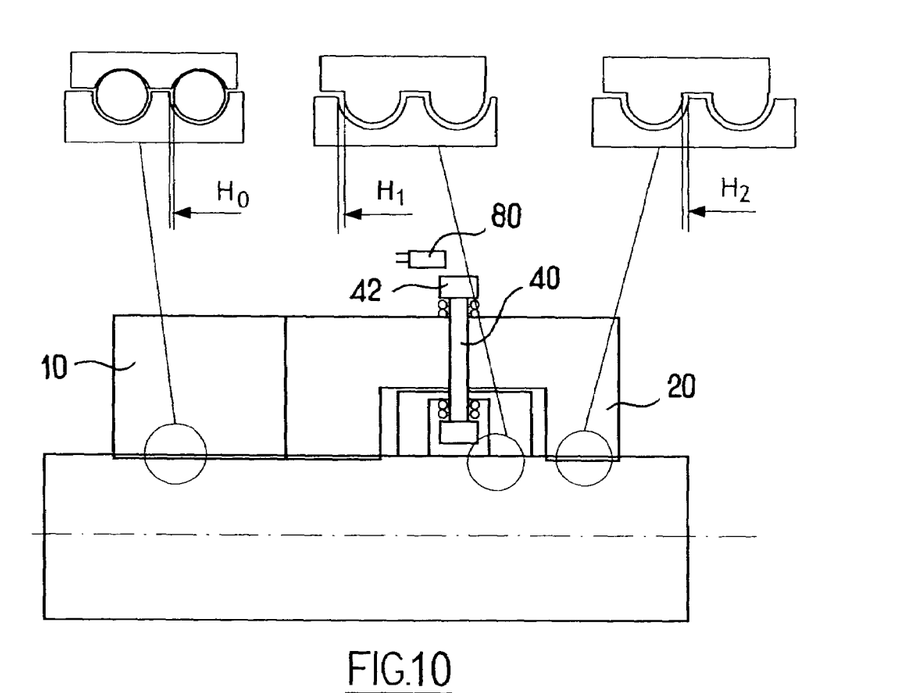

FIG. 10 shows such a system in its initial state, i.e. without any damage to the primary nut 10.

Figure 11:
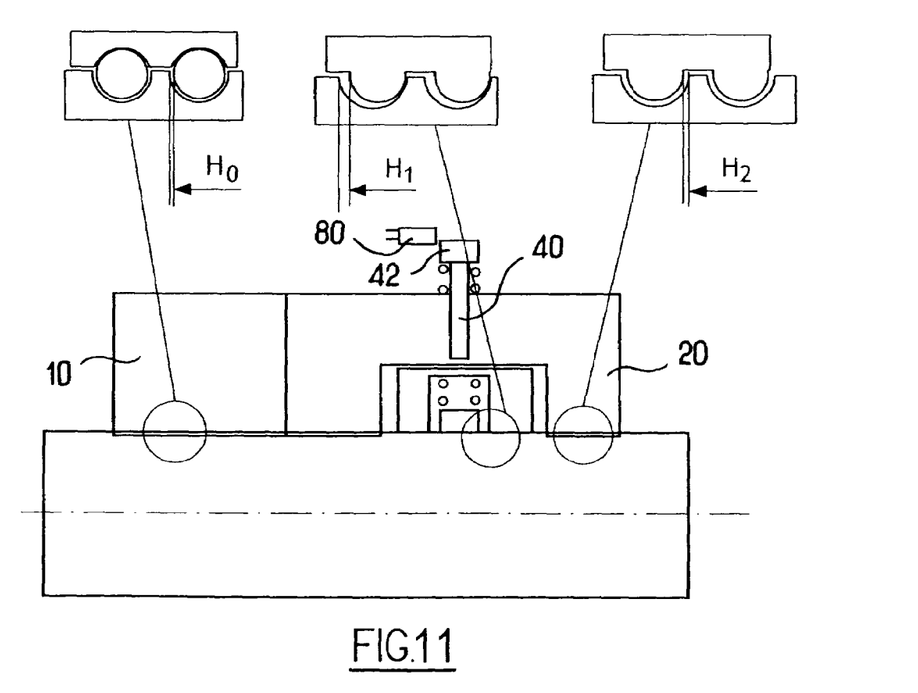
Figure 12:
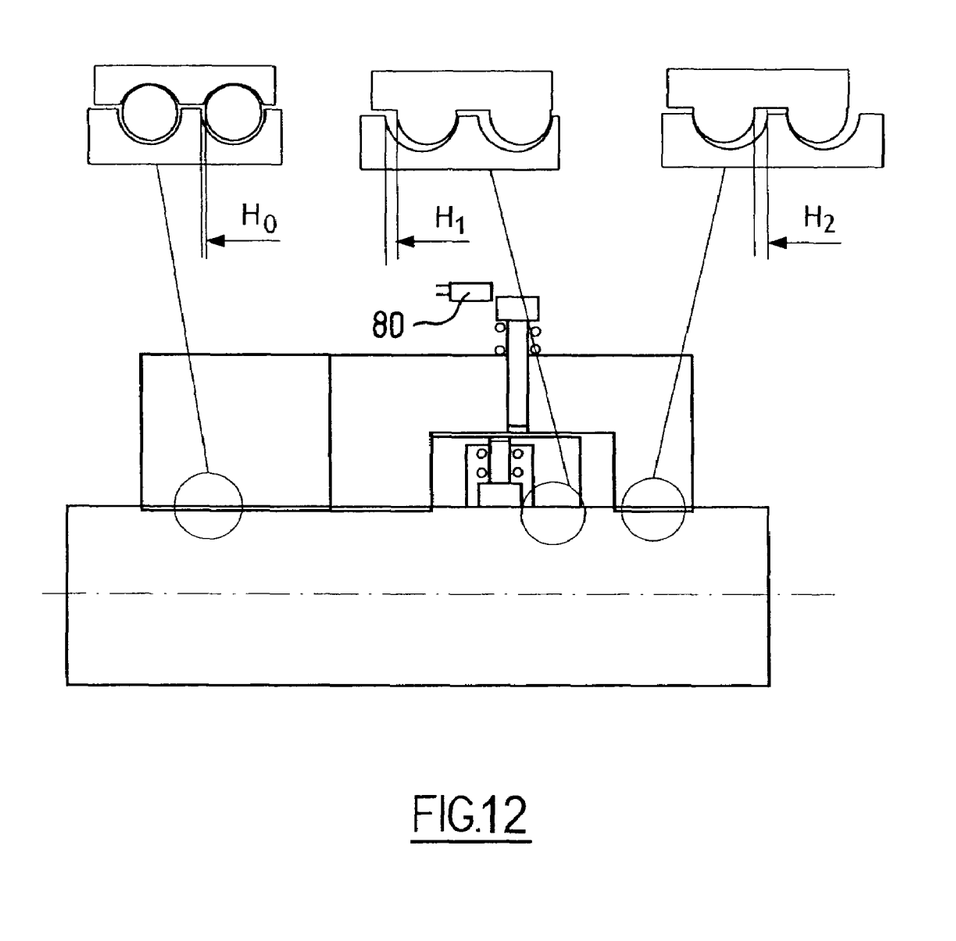

FIGS. 10 to 12 show respective states of the various clearances H0, H1, H2 in respective ones of the above-described three successive states leading to blocking.

In FIG. 10, it can be observed that the clearance H1 of the lock nut 80 and the clearance H2 of the secondary nut 20 are sufficient to avoid putting either of the two elements in contact with the screw while the system is operating ordinarily.

In FIG. 11, it can be observed that wear appearing in the coupling between the screw 30 and the primary nut 10 causes the lock nut 80 to be brought into abutment against the screw 30, without the secondary nut 20 coming into abutment against the screw. In other words, the secondary nut driven by the primary nut pushes the lock nut 80 away against the screw without itself coming into contact therewith.

FIG. 11 also shows that, under the effect of this thrust, the pin 40 breaks and the secondary nut is free to engage the screw 30.

In FIG. 12, the secondary nut 20 has come into contact with the thread of the screw 30, and is transmitting the load from the THS to the screw. The lock nut 80 previously driven by the screw 30 is then in abutment against an internal face of the secondary nut, blocking said nut on the screw, the system then being blocked. The clearances H1 and H2 are then taken up so that the respective threads of the lock nut 80 and of the secondary nut 20 are in engagement with the screw 30.

It should be noted that these means for blocking the actuator after the secondary nut 20 has been loaded offer a definite advantage in themselves, independently of whether or not the pin has an electrical link running through it.

In an advantageous variant, a detector switch 100 is provided that is placed directly in the vicinity of the outer head 42 of the pin, and that is actuated by the head 42 when said head is pushed away towards the outside of the secondary nut 20 under drive from an external spring of the pin 40.

For example, the switch 100 may be a rocking arm having one end provided with a protuberance situated facing the secondary nut 20.

What is claimed is:

1. An actuator for actuating a moving member, said actuator comprising a screw and at least two nuts engaged on the screw, relative movement between the screw and the nuts generating said actuation, said actuator further comprising a pin through which a conductive wire passes, one of the nuts being a force-transmitting element placed in the path of the force between the screw and the moving member, and a shoulder of the one of said nuts that extends to the vicinity of the other nut, the pin passing both through the shoulder and through an element coupled to the other nut so that any abnormal shift in the one of said nut relative to the screw results in shearing between its shoulder and the element coupled to the other nut, causing the pin to break and causing the conductive wire to be broken, wherein the pin includes a spring that operates to generate a parting force on the pin so that the pin breaking by shearing causes two portions of the pin separated by the pin breaking to move apart.

2. An actuator according to claim 1, constituting an actuator having a primary nut and a secondary nut, each of which is coupled to the moving member via respective fastening stubs, wherein the force-transmitting element which causes shearing if it is abnormally shifted is constituted by an element that lies in the path of the forces between the screw and the moving member via the primary nut, and wherein the shoulder causing the shearing comes from the fastening stubs between the secondary nut and the moving member, so that the abnormal shift is transmitted to the pin via the specific coupling of the secondary nut.

3. An actuator according to claim 2, wherein the shoulder is constituted by the secondary nut itself.

4. An actuator according to claim 1, constituting an actuator of the ball type, in which a primary nut has a series of balls on its face facing the screw for the purpose of providing moving contacts between the screw and the nut.

5. An actuator according to claim 1, wherein the spring is a helical spring surrounding the pin.

6. An actuator according to claim 5, wherein the pin has a wider head at one of its ends, the helical spring pressing at one end against the wider head and at the other end against an element secured to or integral with one of the nuts.

7. An actuator according to claim 1, wherein the pin has two wider heads and is provided with two helical springs, each of which is placed between a wider head and an overlapping portion of a respective nut.

8. An actuator according to claim 1, wherein the pin extends in a direction that is radial relative to the main axis of the screw.

9. An actuator according to claim 1, wherein the conductive wire extends over a go-and-return path inside the pin, the bend in which path is situated in the vicinity of that end of the pin which is closer to the screw.

10. An actuator according to claim 1, wherein clearance between the two nuts is chosen to cause the pin to break by shearing, without causing the electrical link to break by shearing, a spring being provided on the pin so as to push apart the portions separated by the shearing, and so as then to cause the link to break by having longitudinal traction applied to it.

* * * * *